United States Patent [19]

Gohl et al.

[11] Patent Number: 5,511,225
[45] Date of Patent: *Apr. 23, 1996

[54] PROGRAMMABLE CONTROLLER FOR CONTROLLING OUTPUT OF CONTROL SYSTEM BY HAVING CONFIGURATION CIRCUIT COOPERATING WITH MONITOR LOGIC TO SELECTIVELY TRANSMIT RETURN OUTPUT FRAME

[75] Inventors: Pierre Gohl, La Colle Sur Lo; Gerard Gomez, Carro; Pergent Jacky, Carros Le Neuf; Daniel Wojerz, Antibes, all of France

[73] Assignee: AEG Schneider Automation, France

[*] Notice: The term of this patent shall not extend beyond the expiration date of Pat. No. 5,423,005.

[21] Appl. No.: 362,823

[22] Filed: Dec. 22, 1994

Related U.S. Application Data

[62] Division of Ser. No. 859,687, filed as PCT/FR91/00789, Oct. 10, 1991, Pat. No. 5,423,005.

[30] Foreign Application Priority Data

Oct. 11, 1990 [FR] France .................. 90 12542

[51] Int. Cl.⁶ .................................. G06F 15/02
[52] U.S. Cl. .................. 395/821; 364/151; 364/265; 364/266; 364/DIG. 1; 371/2.1
[58] Field of Search ............................ 395/275, 800; 361/2, 6, 18, 31, 33, 86; 371/2.1, 3, 15.1, 16.5, 20.1, 22.3; 364/151

[56] References Cited

U.S. PATENT DOCUMENTS

| 4,862,287 | 8/1989 | Paul ........................... 361/88 |
| 4,910,659 | 3/1990 | Gates et al. ................. 364/900 |
| 5,142,526 | 8/1992 | Moriue et al. ............... 370/13 |

FOREIGN PATENT DOCUMENTS 63-50220 3/1988 Japan.

Primary Examiner—Thomas C. Lee
Assistant Examiner—Moustafa Mohamed Meky
Attorney, Agent, or Firm—William A. Drucker

[57] ABSTRACT

Output control circuit for a programmable logic controller, comprising a control unit (13) and a circuit (14) for controlling and checking output channels (11), including a deserializing section (16). The output circuit receives descending frames (T1) and ascending frames (T2) and, according to its configuration, it returns ascending frames (T3) to the control unit produced from frames (T1) and/or (T2).

19 Claims, 4 Drawing Sheets

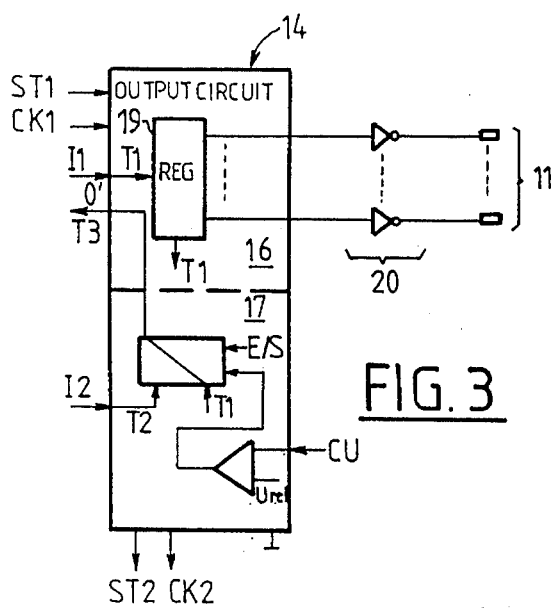
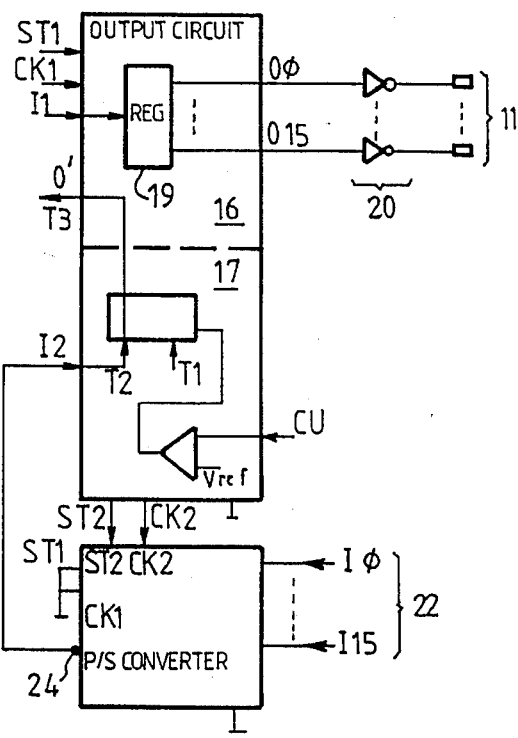
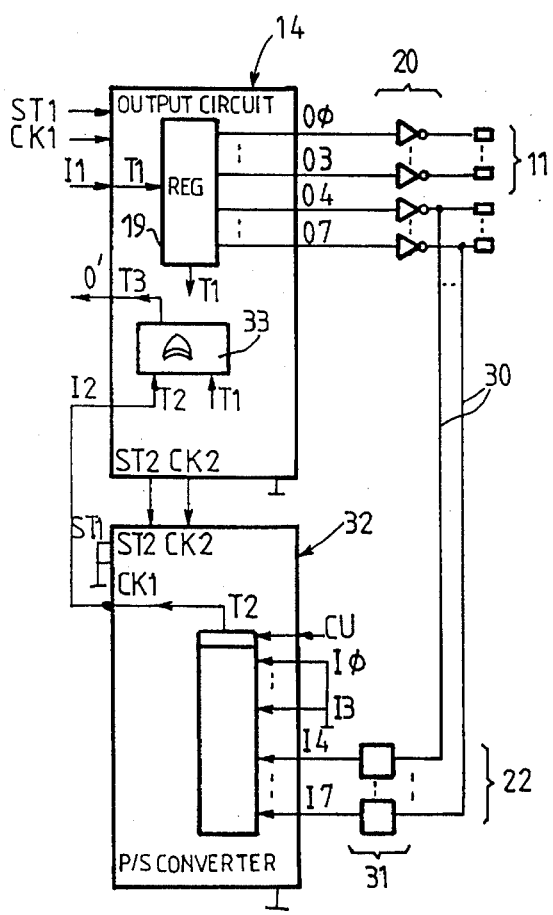
FIG. 3
FIG. 4
FIG. 5

| T1 | B1 | B2 ---- | B17 | B18 | B19 | B20 |
|---|---|---|---|---|---|---|
| output mode | 0 | X --- | X | 0 | 1 | X |
| input mode | 1 | X | X | 1 | 0 | X |
| input/output mode | 0 | X | X | 1 | 0 | X |
| test mode | 1 | X | X | 0 | 1 | X |

| address | A0 | A1 |
|---|---|---|
| 0 | 0 | 0 |
| 3 | 1 | 1 |
| 1 | 1 | 0 |
| 2 | 0 | 1 |

| T2 | B1 | B2 ··· | B17 | B18 | B19 | B20 |
|---|---|---|---|---|---|---|
|  | CU | X -- | X | 0 | 1 | X |

| T3 | B1 | B2 -- | B17 | B18 | B19 | B20 |
|---|---|---|---|---|---|---|
| output mode | CU | X -- | X | 0 | 1 | X |
| input mode | CU | X -- | X | 0 | 1 | X |
| input/output mode | CU | X -- | X | 0 | 1 | X |
| test mode | 1 | X -- | X | 0 | 1 | X |

PROGRAMMABLE CONTROLLER FOR CONTROLLING OUTPUT OF CONTROL SYSTEM BY HAVING CONFIGURATION CIRCUIT COOPERATING WITH MONITOR LOGIC TO SELECTIVELY TRANSMIT RETURN OUTPUT FRAME

This is a divisional of application Ser. No. 07/859,687, filed on Jun. 11, 1992, now U.S. Pat. No. 5,423,005.

BACKGROUND OF THE INVENTION

1. Field of the Invention

The present invention concerns an output management circuit suitable for a programmable control system such as a programmable automatic controller or like device.

2. Description of the Prior Art

The patent FR-2 607 274 describes a programmable automatic controller input-output management circuit comprising an input-output management unit connected to a processor unit adapted to determine the state of output channels according to the state of input channels with reference to a predefined program and an output circuit which comprises a serial to parallel converter having a serial input connected to a serial output of the management unit and parallel outputs connected via a power stage to respective output channels, the output circuit further comprising control and monitor logic.

In this prior art, the output circuit does not benefit from the simplification and the saving in space achieved by parallel to serial conversion of the input data. Also, it would be highly beneficial to make it possible to sent to the management unit information relating to the state of the output channels, in particular to indicate if any channel is open-circuit or short-circuited, or information relating to the absence of voltage at pre-actuators or at the circuit itself.

An object of the invention is to simplify, in a programmable controller system, the routing to appropriate data output channels and the returning to the management unit of control signals contributing to establishing the reliability of communications and to supervising current and/or voltage faults affecting the output lines.

Another object of the invention is to provide dialogue via two up and down serial links between an output management unit or an input-output management unit and an output circuit using frames preferably having a uniform format.

A further object is to confer upon a local or remote output management circuit great flexibility of use by configuring it very simply so that it can be operated in various different operating modes, in particular an "output" mode and an "input" mode, or so that it can be used equally in digital and analog applications.

A further object is to create an output management circuit which lends itself well to implementation in integrated circuit form.

SUMMARY OF THE INVENTION

According to the invention, in a management circuit of the aforementioned type:

the output circuit receives from the output management unit on a first serial input a down frame comprising data bits and at least one control bit, the output circuit receives on a second serial input an up input frame comprising a succession of data bits and at least one control bit, and the output circuit has at least one serial return output connected by a serial link to the output management unit, the logic being adapted to produce from the up frame and/or down frame an up output frame and to route this frame to the serial return output.

The frames returned to the management unit may therefore include bits indicative of the absence of the supply voltage of the pre-actuators or of the module comprising the output circuit or bits indicative of the open-circuit or short-circuited state of one or more output lines.

The up input and output frames preferably have exactly the same format as the down frames.

Configuration means may advantageously be associated with the output circuit, and in particular with its control logic, to achieve selective transmission to the return output of up output frames generated from the down frame or from the up input frame or from both. Likewise, digital-analog application configuration means may be provided to configure selectively output pins of the output circuit either as parallel data output channels or as control connections specific to an analog application.

The output management unit may be connected to the output circuit by respective up and down serial lines and by two clock signal lines, these lines being provided with isolating means such as opto-couplers. The components of the output management circuit are therefore particularly compact and small in number, especially with regard to the isolating means, which means that the reliability of the output management circuit can be increased.

The features and advantages of the invention will be more clearly understood after reading the description below of a non-limiting example referring to the appended figures.

BRIEF DESCRIPTION OF THE DRAWINGS

FIGS. 3 through 5 are block diagrams of the output circuit of the FIG. 1 management circuit respectively configured in output mode, in input mode and in combined output-input mode.

DETAILED DESCRIPTION OF THE INVENTION

Figure 1:
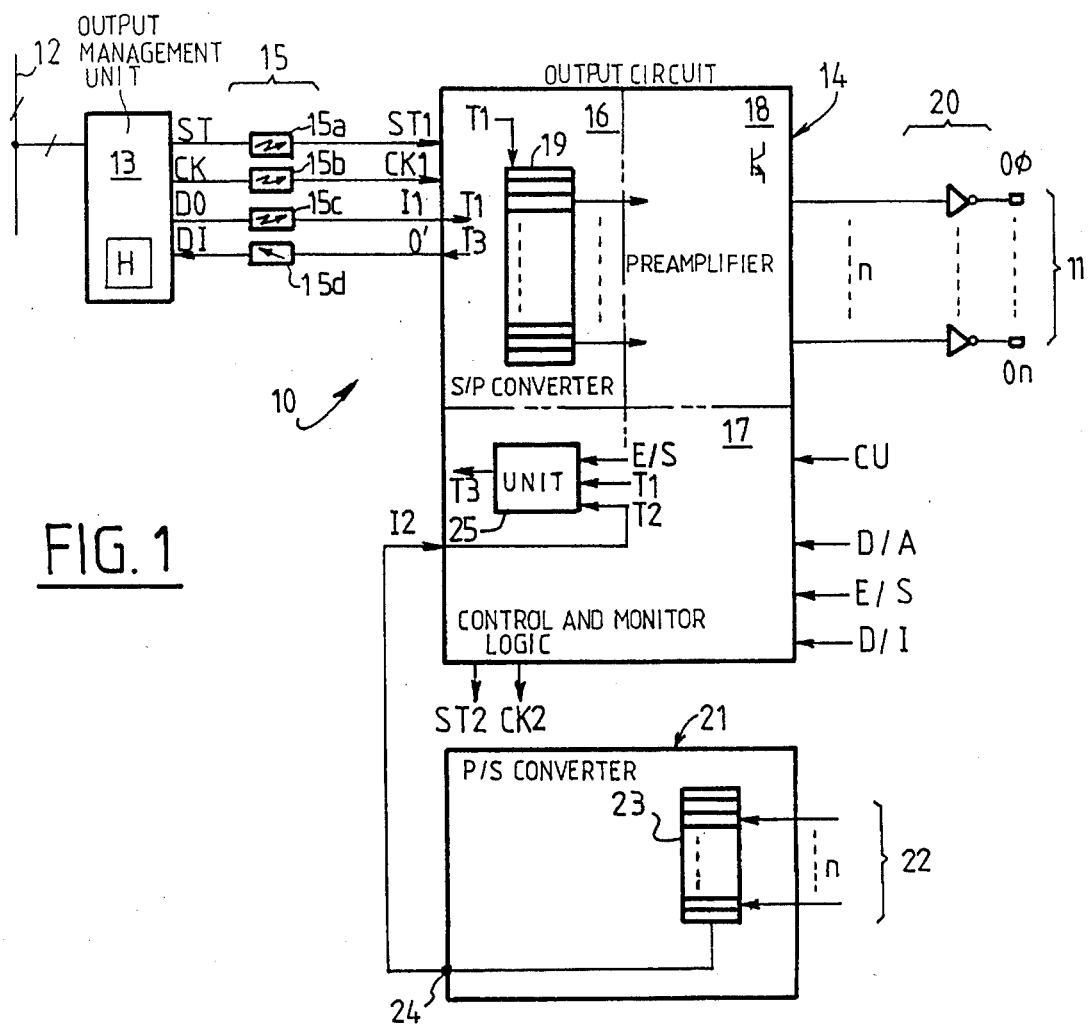
FIG. 1 is the block diagram of an output management circuit in accordance with the invention.

The output management circuit 10 shown in FIG. 1 is part of an automatic control system such as a programmable automatic controller, for example. It is included either in the automatic controller if this is of unitary construction or in a local or remote output module or combined input-output module if the automatic controller is of modular design. The function of the circuit 10 is to control and monitor a number of output channels 11 on the basis of information supplied to an electrical or optical bus or network 12 by one or more processor units (not shown).

The circuit 10 comprises an output management unit 13 which can also be used to manage inputs and an output channel control and monitor circuit 14 referred to hereinafter for short as the output circuit. The unit 13 is connected to the bus 12 by data and service conductors and is connected to the circuit 14 by conductors described later via an isolating interface 15.

The output circuit 14 includes a serial to parallel converter 16 associated with control and monitoring logic 17 and a preamplifier stage 18 whose parallel outputs O0–On constitute the output channels 11 into which amplifiers 20 can be switched.

Note that the output management unit has a clock system H which delivers a frame signal to an ST output and a clock signal to a CK output. As will emerge later, these signals respectively clock frames to be routed and the bits of these frames, in both the down direction (from the unit 13 to the circuit 14) and the up direction (from the circuit 14 to the unit 13). The frames comprise data bits and control bits and, if necessary, configurations; their exact composition will be described with reference to FIGS. 6 through 8 but note that the down frames and the up frames have exactly the same format and exactly the same number of data bits.

The down frames T1 to be routed are delivered to an output D0 of the unit 13 and transmitted from there to a series input of the circuit 14; an input DI of the unit 13 receives the up frames T3 from the circuit 14. The outputs ST, CK and DO of the management unit 13 are connected to inputs ST1, CK1 and I1 of the output circuit 14 via conductors incorporating respective opto-couplers 15a, 15b, 15c of the interface 15.

To route the frames T3 a serial output O' of the circuit 14 is connected to the input DI of the unit 13 via a conductor including an opto-coupler 15d of the interface 15.

Figure 2:
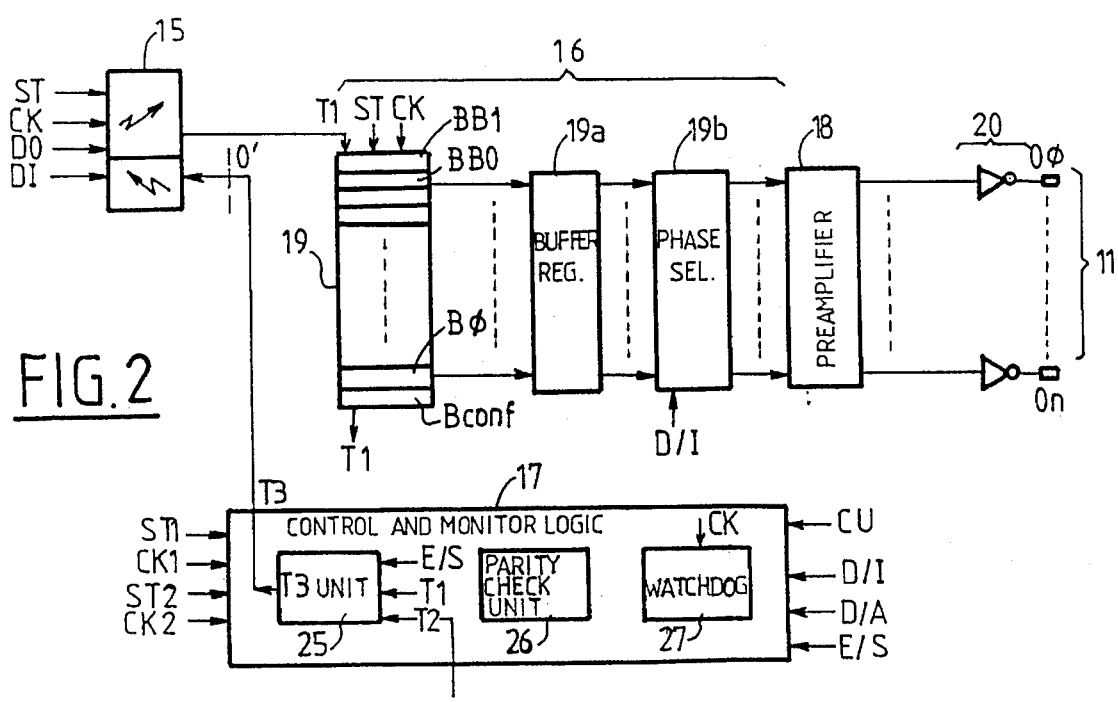
FIG. 2 shows a part of the FIG. 1 management circuit in more detail.

The down frames T1 are serial to parallel converted by a register 19 of the serial to parallel converter 16; the parallel outputs of the register 19 are applied (FIG. 2) to a buffer register 19a which is adapted to be activated by a signal supplied by the logic 17 and is itself connected to a phase selector logic 19b whereby the output signals are in positive or negative logic according to the state of a signal D/I. The parallel outputs of the logic 19b are connected to the inputs of the preamplifier stage 18 seen in FIGS. 1 and 2. The n channels 11 comprise amplifiers 20 which may be protected or not.

Digital or analog application selection logical signals D/A, input and/or output operating mode selection logical signals E/S and direct or inverting output selection logical signals D/I can be applied to the logic 17. Also, a monitoring logic signal CU assigned either to external monitoring of the pre-actuator voltage or to internal monitoring of the voltage of the module including the circuit 14 can be applied to the logic 17. The D/A, E/S, D/I and CU signals are processed by appropriate units of the logic 17. The circuit 14 is supplied with appropriate supply voltages $V_{DD}$, $V_{SS}$.

The up input frames T2 are generated by a parallel to serial converter 21 from data fed to it by parallel conductors 22 the number of which is equal to n, for example. The parallel to serial converter comprises a parallel-serial register 23 connected to the conductors 22 and having a serial output 24 connected to a second serial input I2 of the circuit 14. As appropriate, the conductors 22 are themselves connected to input channels and to output channels 11 where other signals are applied to them.

The logic 17 includes a unit 25 which receives the frame T1, the frame T2 and the E/S signal to deliver an up output frame T3 to the serial output O' of the circuit 14, the frame T3 repeating bits of the frame T1 and/or the frame T2 according to the configuration imparted to the circuit 14 on receiving the previous frame T1.

Each frame T1–T3 includes a parity bit. When each frame is received a parity check unit 26 of the logic 17 recomputes the parity and, if there is any disagreement, produces a signal which is fed to the management unit 13 via the frame T3. Each frame T1–T3 further includes two communication monitoring and configuration bits which are complementary to each other and whose complementarity is verified by the circuit 14 (T1, T2) and by the unit 13 (T3).

The output circuit 14 further includes a watchdog 27 which monitors the activity of the clock signal CK and responds to an error by forcing to 1 the return output O' and deactivating the outputs O0–On. The circuit 14 further includes connections ST2, CK2 which can be connected to another circuit to send or receive the signals ST and CK.

The output circuit 14 can be configured to assume four operating modes: output, input, combined input-output and test, which will be described later. To this end the logic comprises configuration logic means activated either by one or more configuration bits included in a down frame or by the previously mentioned E/S signal. The output circuit 14 can be configured for a digital or analog application by the D/A signal, as will be explained later.

The frames T1, T2, T3 have the same format and contain 20 bits: a configuration (T1) or monitoring (T2, T3) bit B1, 16 data bits B2–B17 representing 16 channels which are output channels, output and input channels or even input channels, two configuration (T1) or communication monitor bits B18, B19 and a parity bit 20. This means that there are 19 signals CK between two signals ST.

The down frame T1 (see FIG. 6) comprises two bits B1, B18 of which with the respective values 0,0 configure the input mode, 1,1 the output mode, 0,1 the input-output mode and 1,0 the test mode. Normally the bit B19 is always complementary to the bit B18 and the logic 17 includes means for verifying this complementarity. The parity bit B20 of the frame T1 is compared with a PAR T1 parity bit computed from B1 through B19 by the unit 26 of the logic 17. If an error is detected in checking the complementarity of B18, B19, the parity or the persistence of the signal CK, the data of the frame T1 is not loaded into the register 19a, the return output O' remains forced to 1 during the next frame and an error counter in the circuit 14 is incremented.

The up input frame T2 (see FIG. 7) includes a voltage monitoring bit B1, 16 data bits B2–B17, two complementary communication monitoring bits B18, B19 and a parity bit B20. This latter bit is compared with a PAR T2 parity bit computed from the bits B2–B17 received from T2 by the unit 26; if there is any disagreement the PAR T2 bit is inverted and incorporated in T3 at position B20.

The up output frame T3 (see FIG. 8) includes a voltage monitoring bit B1, 16 data bits B2–B17, two complementary communication monitoring bits B18, B19 and a parity bit B20. This is consistent with B1 through B19 or inverted assuming the errors mentioned above. The voltage monitoring bit is forced to 1 in test mode.

The data bits B2–B17 of the frame T3 are those of the frame T1 (returned to the management unit 13) in output mode, those of the frame T2 (representing either input channel data or output channel line monitoring data) in input mode, or those obtained by applying the OR logical operator to the frame T1 and the frame T2 in combined input-output mode.

The output mode of the circuit 14 (see FIGS. 3 and 6) is configured for a digital (or "all or nothing") application by the levels B1=0, B18=0, B19=1 of the configuration bits of the down frame T1. The bits of the frame T1 are shifted in the register B19 of the output circuit 14 under the control of the signal CK and transfer of the frame T1 to the register 19*a* is initiated by the signal ST.

The up output frame T3 has a voltage monitoring bit internal or external to the module which is substituted for the configuration bit B1=0 of the previous down frame T1. The bits B2–B17 of T3 are identical to those of the previous frame T1 and can be used by the management unit 13, for example to manage a display unit. The bits B18 and B19 are set to 0 and 1 or to 0 and 0 if the frame T1 received is found to be faulty and the parity bit is inverted if there is a parity error. Note that in an analog application the output mode is configured by the E/S signal.

The "input" operating mode of the circuit 14 (see FIGS. 4 and 7) is configured in a digital application by the levels B1=1, B18=1, B19=0 of the configuration bits of the frame T1, the data of which is as previously transmitted to the parallel output channels 11. The input I2 of the circuit 14 receives the frame T2 described above. In an analog application the input mode is configured by the E/S signal.

Note that the input data I0–I15 available on the parallel channels 22 comprises logic signals representing either the state of at least one analog input channel or several digital input channels or the state (open-circuit or short-circuit) of the line of each of the output channels whose state has been determined by the previous down frame T1.

The "input-output" operating mode of the circuit 14 (see FIGS. 5 and 8) is configured in the digital application by the levels B1=0, B18=1, B19=0 of the configuration bits of the frame T1 whose data bits B2–B17 are again transmitted to the output channels 11. In the embodiment shown in FIG. 5 there are four output channels O0–O3 and four channels O4–O7 that can be configured as outputs or inputs. It is assumed that the latter four channels are configured as inputs and that the output connections are therefore connected by conductors 30 and filter and threshold units 31 to inputs I4–I7 of an input parallel to serial converter 32.

This parallel to serial converter is advantageously of the type described in the patent FR-2 607 274 the inputs I0–I3 of which are connected to the zero potential. In this way the frame T2 from the input circuit 32 may comprise as its bit B1 a voltage monitoring bit CU indicative of the voltage of sensors connected to the input channels. The bits B1, B18 and B19 of T2 are transposed in the frame T3 without modification but the bits B2 through B17 of T2 are combined in a unit 33 of the logic 17 implementing the logic OR operation bit by bit with those of the previous frame T1.

Note that the ST2, CK2 connections of the circuit 14 are connected to the ST2, CK2 connections of the circuit 32 to transmit to the latter the signals ST, CK.

Figures 6, 7, 8, 9, 10, 11:
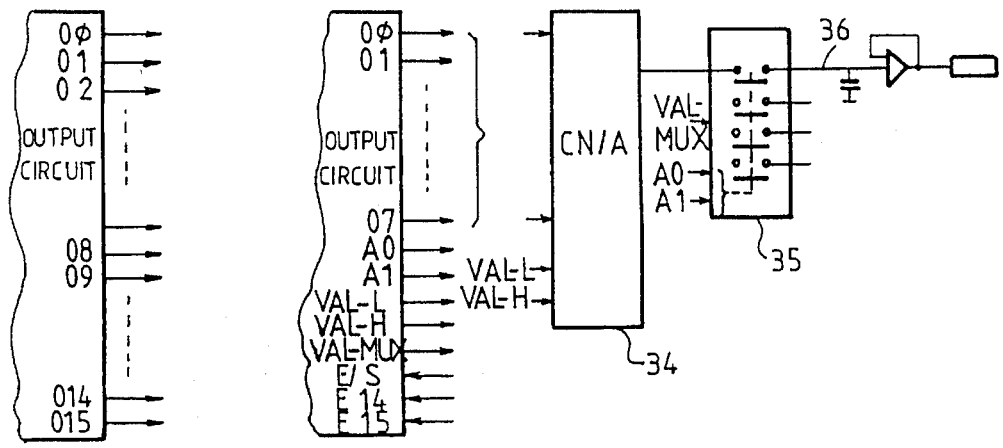
FIGS. 6 through 8 are tables showing the composition of the down frames, up input frames and up output frames in the various configurations of the circuit.
FIG. 9 is a table complementing that of FIG. 6 in an analog application.
FIGS. 10 and 11 show the output channels of the circuit respectively in a digital application and in an analog application.

FIG. 9 shows an addition to the FIG. 6 table showing the meaning of the bits B18, B19 in an analog application with the circuit 14 in output mode: these bits code four different addresses enabling output on four analog channels.

It is particularly beneficial for the circuit 14 to be implemented in the form of an integrated circuit.

FIG. 10 shows one example of the topology of the output pins of an integrated circuit 14 having 16 digital outputs O0–O15. FIG. 11 shows the same circuit in which eight outputs O0–O7 are connected to the data inputs of a digital-analog converter 34 whose analog output is connected to a demultiplexer 35 which is able, by means of two address bits A0, A1, to transmit the analog magnitude to four analog channels 36. Signals VAL-L, VAL-H are applied to the D/A converter 34 to obtain an output resolution of up to 16 bits and a VAL-MUX signal is applied to the demultiplexer 35. The address signals A0, A1 and the service signals VAL-L, VAL-H and VAL-MUX are supplied by the circuit 14 on output pins O8–O12 which were used in the digital mode for data outputs.

Figure 12:
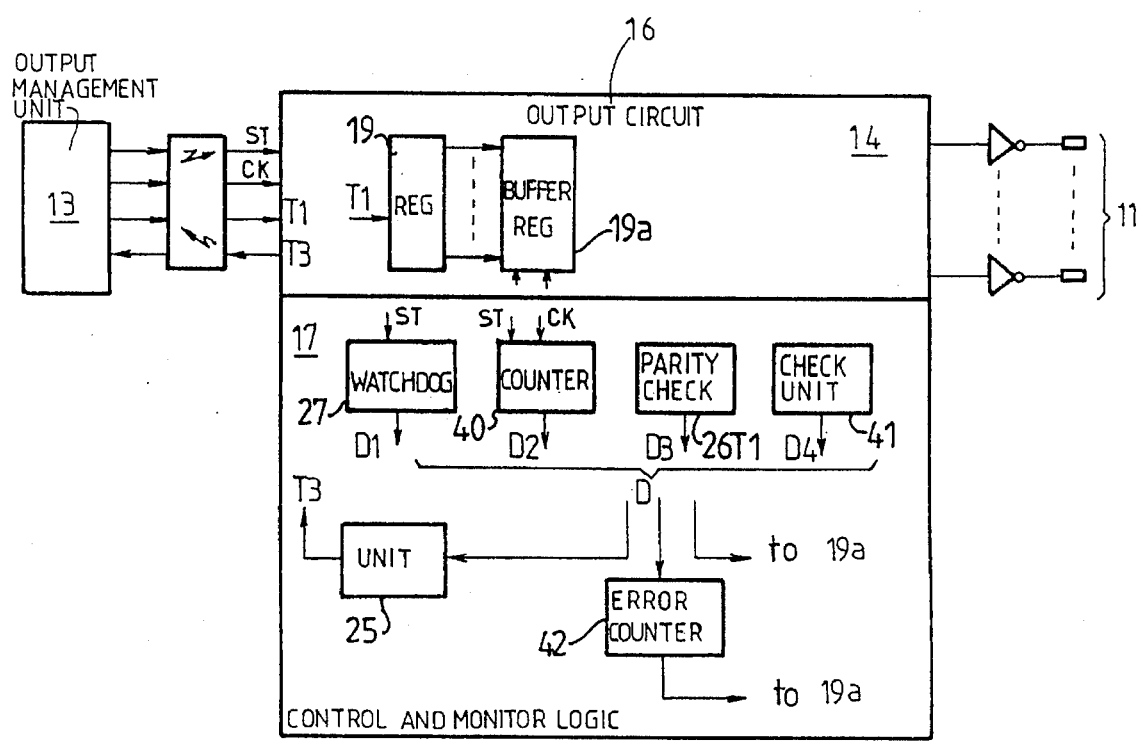
FIG. 12 shows the management of faults affecting down communications.

FIG. 12 shows how the logic 17 processes communication errors. As already explained with reference to FIG. 2 the logic 17 comprises a parity check unit 26 and a watchdog 27 monitoring activation of the signal CK. It further comprises a counter 40 which determines if two consecutive signals ST are separated by 19 signals CK and a unit 41 which checks that B18 and B19 are complementary. Only the part 26 T1 of the unit 26 which checks the parity of the down frame T1 is described here.

Each unit 26, 27, 40, 41 is adapted to output a respective signal D1, D2, D3, D4 when it registers a down communication error. The logic 17 applies the OR logical operator to these signals to generate a fault signal D sent to the unit 25 which builds the frame T3 and to one of the parallel registers of the output circuit 14, for example to a validation input of the register 19*a*; the signal D is also sent to an error counter 42. When D is activated the unit 25 modifies the frame T3 by setting it to 0, for example, so as to alert the unit 13 and transfer of the content of the register 19 to the register 19*a* is disabled; the state of the output 11 is therefore unchanged. The counter 42 is incremented and if the signal D remain activated during the reception of several consecutive frames T1, four consecutive frames, for example, this output is activated and resets the channels 11 via the register 19*a* or another output circuit unit 14.

It goes without saying that modifications may be made to the embodiment described without departing from the scope of the invention. For example, some pins of the integrated circuit may be duplicated. The same pin may be used to input the signal CU and the signal E/S, for example. In a single-channel analog application only two bits of each frame T2 and T3 are used to return the "open circuit" and "short-circuit" indications.

There is claimed:

1. A local or remote output management device for controlling outputs of a programmable control system, which determines the state of output channels from the state of input channels according to a predetermined program, said device comprising:

an output management unit connected to outputs of said programmable control system, an output circuit comprising a control and monitor logic having a first serial input, a serial to parallel converter having a second serial input connected to a serial output of the output management unit and parallel outputs connected respectively to said output channels, the output circuit further comprising at least one serial return output connected to the output management unit and to an output of the control and monitor logic, said second serial input being connected to an input of the control and monitor logic, an input circuit connected to said first serial input of the output circuit, the output circuit receiving from said output management unit on said second serial input a down frame comprising at least a control bit and data bits determining the state of the outputs channels, the output circuit further receiving from said input circuit on said first serial input an up input frame comprising at least data bits and a control bit, said data bits comprising bits indicative of electrical faults, and the output circuit sending to said output management unit on the serial return output an up output frame produced by the control and monitor logic from the up input frame and the down frame, wherein the output circuit is associated with configuration means for configuring an operating mode of said circuit and said configuration means cooperate with the control and monitor logic to transmit selectively to the return output an up output frame which is produced either from the down frame or from the up input frame.

2. The device of claim 1, wherein the up output frame has exactly the same format as the down frame.

3. The device of claim 1, wherein the up input frame has exactly the same format as the down frame.

4. The device of claim 1, wherein the up output frame includes a voltage monitoring bit.

5. The device of claim 1, wherein the configuration means comprise at least one configuration bit included in the down frame.

6. The device of claim 1, wherein said input circuit comprises a parallel to serial converter which generates the up input frames, said parallel to serial converter having a serial output which is connected to the first serial input of said output circuit and parallel inputs which are connected respectively to said output channels for detecting electrical faults therein.

7. The device of claim 1, wherein said input circuit comprises a parallel to serial converter which generates the up input frames, said parallel to serial converter having a serial output which is connected to the first serial input of said output circuit and parallel inputs which are connected respectively to said input channels for detecting electrical faults therein.

8. A local or remote output management device for controlling outputs of a programmable control system, which determines the state of output channels from the state of input channels according to a predetermined program, said device comprising:

an output management unit connected to outputs of said programmable control system, an output circuit comprising a control and monitor logic having a first serial input, a serial to parallel converter having a second serial input connected to a serial output of the output management unit and parallel outputs connected respectively to said output channels, the output circuit further comprising at least one serial return output connected to the output management unit and to an output of the control and monitor logic, said second serial input being connected to an input of the control and monitor logic, an input circuit connected to said first serial input of the output circuit, the output circuit receiving from said output management unit on said second serial input a down frame comprising at least a control bit and data bits determining the state of the outputs channels, the output circuit further receiving from said input circuit on said first serial input an up input frame comprising at least data bits and a control bit, said data bits comprising bits indicative of electrical faults, and the output circuit sending to said output management unit on the serial return output an up output frame produced by the control and monitor logic from the up input frame and the down frame, wherein the output circuit is associated with digital-analog application configuration means which cooperate with the control and monitor logic to configure selectively pins of the output circuit either as data output channels or as control connections specific to an analog application.

9. The device of claim 8, wherein the output management unit produces clock signals which respectively time the down frames and up frames and the bits constituting said frames.

10. The device of claim 9, wherein the output management unit is connected to the output circuit via up and down serial lines and two clock signal lines provided with isolating means.

11. A local or remote output management device for controlling outputs of a programmable control system, which determines the state of output channels from the state of input channels according to a predetermined program, said device comprising:

an output management unit connected to outputs of said programmable control system, an output circuit comprising a control and monitor logic having a first serial input, a serial to parallel converter having a second serial input connected to a serial output of the output management unit and parallel outputs connected respectively to said output channels, the output circuit further comprising at least one serial return output connected to the output management unit and to an output of the control and monitor logic, said second serial input being connected to an input of the control and monitor logic, an input circuit connected to said first serial input of the output circuit, the output circuit receiving from said output management unit on said second serial input a down frame comprising at least a control bit and data bits determining the state of the outputs channels, the output circuit further receiving from said input circuit on said first serial input an up input frame comprising at least data bits and a control bit, said data bits comprising bits indicative of electrical faults, and the output circuit sending to said output management unit on the serial return output an up output frame produced by the control and monitor logic from the up input frame and the down frame, wherein the output circuit is associated with configuration means for configuring an operating mode of said circuit and said configuration means cooperate with the control and monitor logic to transmit selectively to the return output an up combined output frame produced from the down frame and the up input frame.

12. The device of claim 11, wherein the up output frame has exactly the same format as the down frame.

13. The device of claim 11, wherein the up input frame has exactly the same format as the down frame.

14. The device of claim 11, wherein the configuration means comprise at least one configuration bit included in the down frame.

15. The device of claim 11, wherein the up output frame includes a voltage monitoring bit.

16. The device of claim 11, wherein said input circuit comprises a parallel to serial converter which generates the up input frames, said parallel to serial converter having a serial output which is connected to the first serial input of said output circuit and parallel inputs which are connected respectively to said output channels for detecting electrical faults therein.

17. The device of claim 11, wherein said input circuit comprises a parallel to serial converter which generates the up input frames, said parallel to serial converter having a serial output which is connected to the first serial input of said output circuit and parallel inputs which are connected respectively to said input channels for detecting electrical faults therein.

18. A local or remote output management device for controlling outputs of a programmable control system, which determines the state of output channels from the state of input channels according to a predetermined program, said device comprising:

an output management unit connected to outputs of said programmable control system, an output circuit comprising a control and monitor logic having a first serial input, a serial to parallel converter having a second serial input connected to a serial output of the output management unit and parallel outputs connected respectively to said output channels, the output circuit further comprising at least one serial return output connected to the output management unit and to an output of the control and monitor logic, said second serial input being connected to an input of the control and monitor logic, an input circuit connected to said first serial input of the output circuit, the output circuit receiving from said output management unit on said second serial input a down frame comprising at least a control bit and data bits determining the state of the outputs channels, the output circuit further receiving from said input circuit on said first serial input an up input frame comprising at least data bits and a control bit, said data bits comprising bits indicative of electrical faults, and the output circuit sending to said output management unit on the serial return output an up output frame produced by the control and monitor logic from the up input frame and the down frame, wherein the output circuit comprises a plurality of down communication monitoring units associated together in such a way as to generate an error signal, and connected to said control and monitor logic and to a counter, said error signal being sent to said control and monitor logic for disabling transfer of data from a defective frame to the output channels, and sent to said counter which is connected to said serial to parallel converter and which resets the output channels if the error signal persists for a plurality of consecutive down frames.

19. The device of claim 18, wherein the control and monitor logic which produces the up output frame from the up input frame and down frame, comprises means to produce a modified up output frame when the error signal is sent to said control and monitor logic.

* * * * *